April 12, 1927.  1,624,485
H. J. FERRIS
PIPE PROTECTOR
Filed Nov. 30, 1925
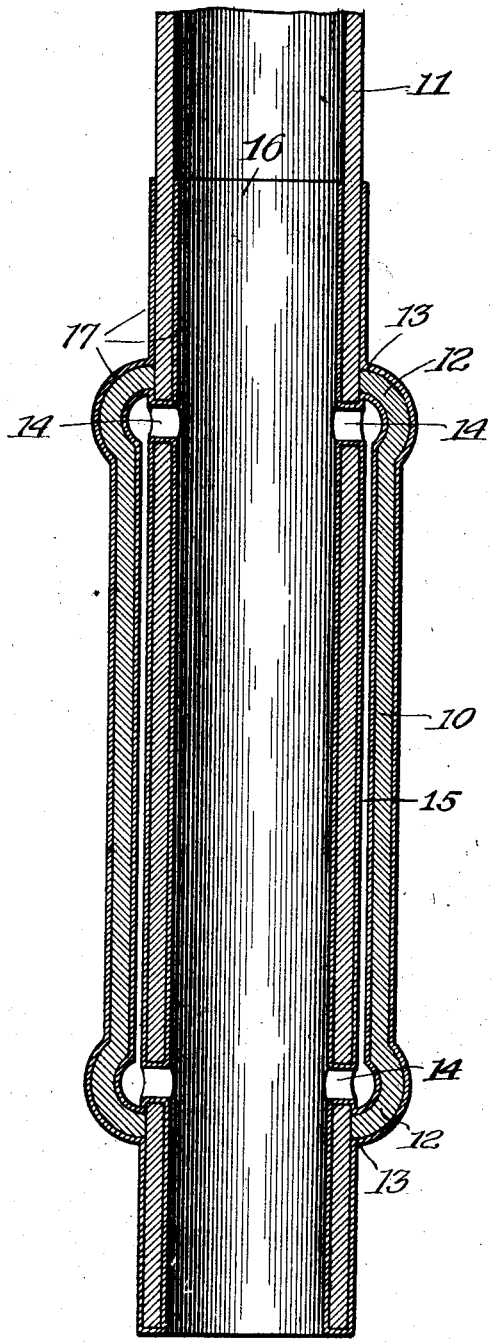
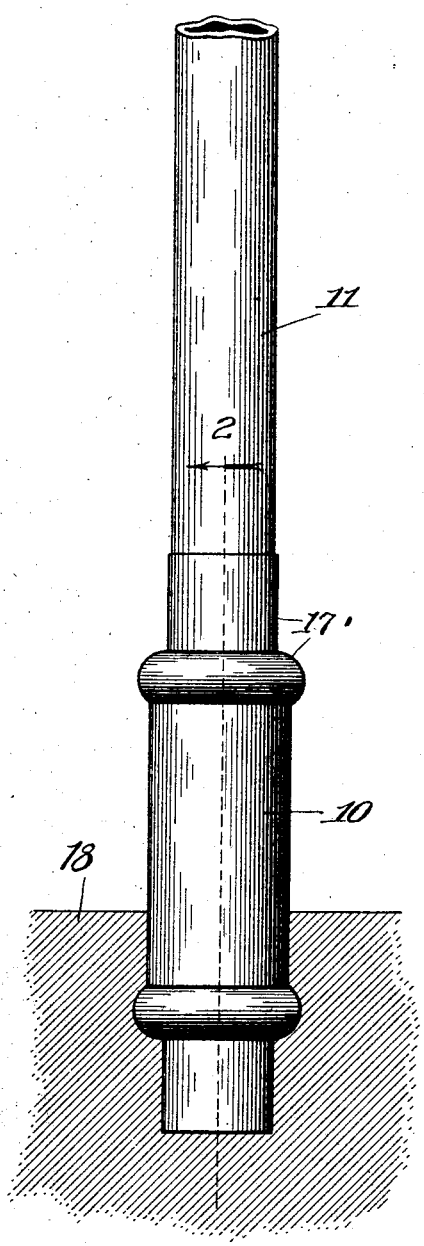
Inventor:
Howard J. Ferris,
By Dyrenforth, Lee, Chritton & Wiles
Attys.

Patented Apr. 12, 1927.

1,624,485

UNITED STATES PATENT OFFICE.

HOWARD J. FERRIS, OF HARVARD, ILLINOIS, ASSIGNOR TO HUNT, HELM, FERRIS & COMPANY, A CORPORATION OF ILLINOIS.

PIPE PROTECTOR.

Application filed November 30, 1925. Serial No. 72,194.

This invention relates to pipe protectors and is particularly adapted to be used as a protector for iron pipe and the like which is partially embedded in concrete.

The invention is fully described in the following specification and shown in the accompanying drawings, in which, Figure 1 is a side elevation of a pipe having a protector thereon, partially embedded in concrete, and Fig. 2 is an enlarged longitudinal section of the same.

The pipe protector as illustrated comprises a metal sheath 10 adapted to slip over an iron pipe 11 or the like, and having slightly enlarged and rounded ends 12 which may be forced in so as to tightly grip the pipe 11 as shown in Fig. 2. This may be done by placing the rounded ends 12 in a suitable press and pressing in on them in a line 13 closely adjacent to the pipe 11 or by spinning, peening or similarly manipulating the ends of the sleeve 10 at this point.

Before this is done, however, the pipe 11 may be drilled at 14 to provide openings adjacent the ends of the annular space 15 which lies between the sleeve 10 and the pipe 11.

With the sleeve firmly set upon the pipe 11 as has just been described, the whole is then inserted into a container having a suitable rust preventing solution such as asphaltum. This rises to a point 16 above the sheath and forms a coating 17 upon all of the exposed surfaces of the pipe and sheath and flows through the openings 14 thereby coating the walls of the annular space 15.

When this has completely set, the whole is partially embedded in concrete 18 as shown in Fig. 1. The sheath 10 then acts to protect the pipe 11 from rust, which ordinarily occurs most rapidly at the point where the pipe 11 meets the upper surface of the concrete. This is particularly true where iron pipes are partially buried in concrete in connection with the installation of stalls in barns and the like. In this case the presence of considerable quantities of ammonia laden moisture greatly hastens the rusting of the iron pipe at the point it passes into the concrete with the result that after a few years pipes so placed are frequently completely rusted off. The present invention is designed to prevent this unnecessary deterioration of these iron pipes.

If desired, the holes 14 may be omitted and the pipe dipped as before. Even this dipping in a rust preventing coating 17 may also be omitted for many classes of work as no appreciable amount of rusting occurs below the surface of the concrete or at a distance of three or four inches above it as shown in Fig. 1. Experience has shown that by far the most vulnerable point is where the pipe enters the surface of the concrete and, in this instance, the cast iron protector prevents rusting at this point.

While I have shown and described certain embodiments of my invention, it is to be understood that it is capable of many modifications. Changes, therefore, in the construction and arrangement may be made without departing from the spirit and scope of the invention as disclosed in the appended claims.

What I claim as new, and desire to secure by Letters Patent, is:

1. In combination, a pipe, a sleeve surrounding said pipe and tightly secured thereon so as to exclude moisture therefrom for the protection of said pipe at the point where it enters concrete, said sleeve being spaced from said pipe throughout the greater portion of its length, and holes through the pipe communicating with said space near its ends whereby a protecting coating may be applied to all surfaces not in contact by dipping said sleeve and pipe.

2. In a stall construction for use in a barn and the like, a pipe adapted to have its lower end partially incased in concrete, a sleeve surrounding the lower portion of said pipe and having inwardly inclined ends one of which tightly fits said pipe to retain said sleeve in place thereon, the central portion of said sleeve being spaced from said pipe to form an annular space and a port into said space through which a protective liquid may be passed into said space.

HOWARD J. FERRIS.